(12) United States Patent
Yoshigai

(10) Patent No.: US 8,556,433 B2
(45) Date of Patent: Oct. 15, 2013

(54) PROJECTOR

(75) Inventor: Akio Yoshigai, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 174 days.

(21) Appl. No.: 13/156,456

(22) Filed: Jun. 9, 2011

(65) Prior Publication Data

US 2011/0304831 A1    Dec. 15, 2011

(30) Foreign Application Priority Data

Jun. 14, 2010  (JP) ................... 2010-135212

(51) Int. Cl.
*G03B 21/28* (2006.01)
*G03B 21/14* (2006.01)

(52) U.S. Cl.
USPC ................ 353/85; 353/98; 359/630

(58) Field of Classification Search
USPC ............ 353/85, 121, 122, 98; 362/553, 555, 362/561, 231; 348/771; 372/23, 29.014, 372/29.015
See application file for complete search history.

(56) References Cited

U.S. PATENT DOCUMENTS

| | | | | |
|---|---|---|---|---|
| 7,144,117 B2 * | 12/2006 | Kojima | ........................... | 353/37 |
| 7,959,303 B2 * | 6/2011 | Nishioka et al. | ................ | 353/85 |
| 8,123,367 B2 * | 2/2012 | Nagashima et al. | ............ | 353/98 |
| 8,142,021 B2 * | 3/2012 | Silverstein et al. | ............... | 353/7 |
| 2006/0279710 A1 * | 12/2006 | Tani | ................ | 353/85 |

FOREIGN PATENT DOCUMENTS

| | | |
|---|---|---|
| JP | 2003-295319 A | 10/2003 |
| JP | 2005-326646 A | 3/2005 |

OTHER PUBLICATIONS

Chinese Notice on Initial Examination Opinions dated May 2, 2013 (and English translation thereof) in counterpart Chinese Application No. 201110157166.0.

* cited by examiner

*Primary Examiner* — William C Dowling
(74) *Attorney, Agent, or Firm* — Holtz, Holtz, Goodman & Chick, PC

(57) ABSTRACT

There is provided a projector comprising, a light source unit having a laser light emitter and a projection light producing device for converting the laser light into projection light, a display unit and a light guiding optical system which forms a projection optical path along which light from the light source unit is guided to the display device, the projector comprising a partial light separation unit which reflects or transmits part of light emitted from the projection light converting device of the light source unit so as to separate the part of the light to an optical path which is different from the projection optical path, a photosensor which is disposed on the optical path which is separated and changed by the partial light separation unit, a light intensity determination unit which detects an light intensity of the laser light which is separated by the partial light separation unit so as to determine whether or not the light intensity exceeds a threshold, and a light source control unit which stops the emission of the laser light emitter based on the result of the determination of the light intensity determination unit.

6 Claims, 7 Drawing Sheets

PROJECTOR

CROSS-REFERENCE TO RELATED APPLICATIONS

This application is based upon and claims the benefit of priority under 35 USC 119 of Japanese Patent Application No. 2010-135212 filed on Jun. 14, 2010, the entire disclosure of which, including the description, claims, drawings and abstract thereof, is to be incorporated herein by reference.

BACKGROUND OF THE INVENTION

1. Field of the Invention

The present invention relates to a projector which includes a laser light emitter.

2. Description of the Related Art

In these days, data projectors are used on many occasions as image projection apparatuses which project images including images of screens and video images of personal computers, as well as images based on image data which is stored in memory cards on to a screen. These projectors are such that light emitted from a light source is collected to a micromirror device called DMD (Digital Micromirror Device) or a liquid crystal plate for display of a color image onto the screen.

Conventionally, the mainstream of these projectors has been those which use a high-intensity discharge lamp as a light source. However, in recent years, there have been made many developments and proposals on projectors which use, as a light emitting element of a light source, a light emitting diode (LED), a laser light emitter, a semiconductor light emitting device such as a device utilizing organic EL, technology or a luminescent material which absorbs excitation light to emit light of a predetermined wavelength.

As a projector which uses a laser light emitter, for example, Japanese Unexamined Patent Publication No. 2003-295319 (JP-A-2003-295319) proposes a light source unit in which coherent light emitted from a laser light emitter is converted into incoherent light by a luminescent material or a diffusion plate and the resulting incoherent light is emitted to the outside of the projector, whereby any laser beam is prevented from being emitted directly to the outside as light source light.

In a projector like this, safety is increased by adding a safety device for switching off the laser light emitter when the fall or detachment of the luminescent material or the diffusion plate is detected or disposing an additional diffusion plate on an optical path of the incoherent light. Consequently, in this projector, when the luminescent material or the diffusion plate falls, the safety device is activated to stop the emission of laser light from the laser light emitter momentarily, or laser light is prevented from leaking out as it is by the auxiliary diffusion plate. Thus, the time during which laser light is shone to other positions than the predetermined position or leaks out is made as short as possible to thereby ensure the safety of the projector.

However, when the safety of the projector is ensured by incorporating in the projector the safety device which detects the fall or detachment of the luminescent material or the diffusion plate so as to prevent laser light from not being converted into luminescent light or diffusion light or by adding the diffusion plate, space for the safety device and the diffusion plate needs to be secured and the parts need to be added, leading to a problem with miniaturization of the projector and a problem of increased costs due to involving the additional labor hours in fabrication of the projector.

SUMMARY OF THE INVENTION

The invention has been made in view of the problems inherent in the related art, and an object thereof is to provide a projector which can detect abnormality by a partial light separation unit provided on an optical path for separating part of a ray of light and a photosensor provided in an illumination range of the part of the ray of light so separated.

According to the invention, there is provided a projector having a light source unit having, in turn, a laser light emitter for emitting laser light and a projection light producing device for converting the laser light into projection light, a display device, and a light guiding optical system for forming a projection optical path along which light from the light source unit is guided to the display device, the projector comprising projector.

BRIEF DESCRIPTION OF THE DRAWINGS

The invention will be understood much sufficiently by reading the following detailed description thereof and referring to the accompanying drawings. However, the detailed description and the accompanying drawings are intended mainly to describe the invention and are not intended to limit the scope thereof. In the accompanying drawings.

Figure 1:
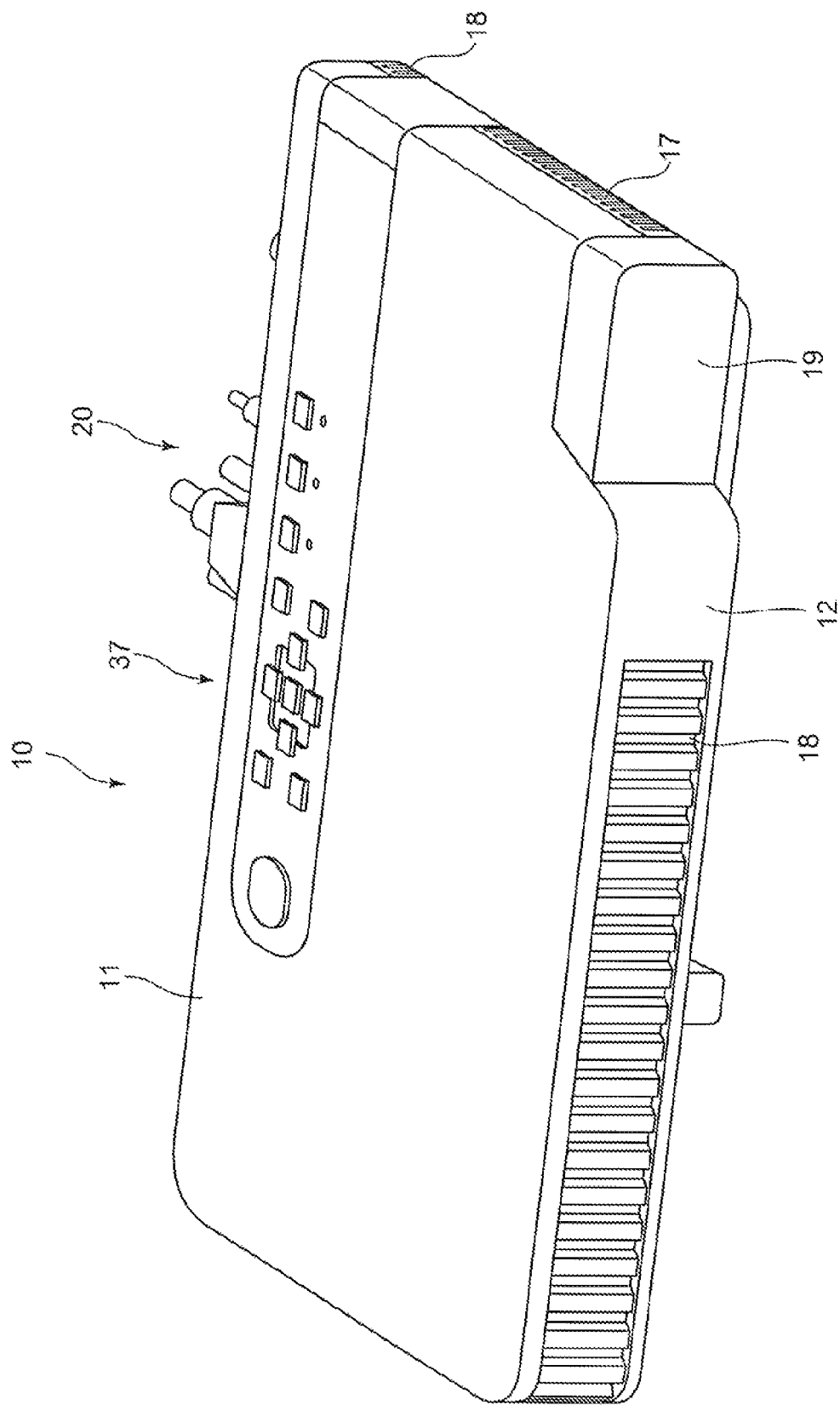
FIG. 1 is an external perspective view showing a projector according to an embodiment of the invention.

According to the invention, the projector can be provided in which the partial light separation unit is provided so that part of the laser light is shone on to the optical path which is different from the projection optical path, and the photosensor is provided within the illumination range of the part of the ray of laser light to determine whether or not the intensity thereof exceeds the threshold for detection of abnormality, thereby making it possible to prevent the shining of the laser light to other places than the predetermined optical path within the projector or leaking out of the detecting laser light of the projector according to the modified example of the embodiment of the invention.

DETAILED DESCRIPTION OF THE PREFERRED EMBODIMENT

Hereinafter, a preferred mode for carrying out the invention will be described by use of the accompanying drawings.

Although various limitations which are technically preferable for carrying out the invention are imposed on an embodiment which will be described below, the scope of the invention is not limited in any way to the following description and illustrated examples.

Hereinafter, a mode for carrying out the embodiment will be described. A projector 10 of the invention includes a light source unit 60 which has an excitation light shining device 70 which is a laser light emitter for emitting laser light produced by an excitation light source 71 and a luminescent light emitting device 100 which is a projection light producing device for converting the laser light into projection light. In addition, the projector 10 has a display device 51 and a light guiding optical system 170 which forms a projection optical path along which light from the light source 60 is guided to the display device 51. In addition, the projector 10 includes reflection angle changing portions 141a, 148a or a transmitting portion 145b which constitutes a partial light separation unit which is disposed in a predetermined position on the projection optical path and which reflects or transmits part of light emitted from the projection light producing device of the light source unit 60 and separates the part of the light to a determination optical path which differs from the projection optical path. Further, the projector 10 includes a photosensor 46 which is disposed on the determination optical path which is separated and changed by the reflection angle changing portions 141a, 148a or the transmitting portion 145b and a control unit 38 which functions as a light intensity determination unit which causes the photosensor 46 to detect a light intensity of the laser light separated by the reflection angle changing portions 141a, 148a or the transmitting portion 145b so as to determine whether or not the light intensity so detected exceeds a threshold. The projector 10 additionally includes a light source control circuit 41 which functions as a light source control unit for stopping the emission of excitation light of the excitation light shining device 70 based on the result of the detection of the control unit 38 functioning as the light intensity determination unit.

Then, by providing the reflection angle changing portions 141a, 148a or the transmitting portion 145b in a spot area which is an illumination area of the laser light which is not converted into incoherent light when the luminescent material layer or the like falls or is detached on a mirror which reflects or transmits light emitted from the projection light producing device of the light source unit 60, the partial light separation unit changes the optical path so that part of light shone on to the mirror is separated from the projection optical path.

In addition, when the result of the determination by the control unit. 38 functioning as the light intensity determination unit exceeds the threshold, the light source control unit 41 stops the emission of excitation light of the excitation light shining device 70.

The photosensor 46 is a CCD sensor or a CMOS sensor. Hereinafter, an embodiment of the invention will be described in detail by reference to the accompanying drawings.

FIG. 1 is a perspective view showing an external appearance of a projector 10. In this embodiment, left and right with respect to the projector 10 denote, respectively, left and right directions with respect to a projecting direction, and front and rear denote, respectively, front and rear directions with respect to a direction towards a screen and a traveling direction of a pencil of light.

As is shown in FIG. 1, the projector 10 has a substantially rectangular parallelepiped shape and has a lens cover 19 which covers a projection port which is laid to a side of a front panel 12 which is referred to as a front side panel of a housing of the projector, as well as a plurality of outside air inlet holes 18 in the front panel 12. Further, although not shown, the projector 10 includes an Ir reception unit for receiving a control signal from a remote controller.

In addition, a keys/indicators unit 37 is provided on an upper side panel 11 of the housing. Disposed on this keys/indicators unit 37 are keys and indicators which include a power supply switch key, a power indicator which informs whether the power supply is on or off, a projection switch key which switches on or off the projection by the projector, an overheat indicator which informs of an overheat condition when a light source unit, a display device, a control circuit or the like overheats.

Further, provided on a back side or a back side panel of the housing are an input/output connector unit where USB terminals, an image signal input D-SUB terminal, an S terminal, an RCA terminal and the like are provided and various types of terminals 20 including a power supply adaptor plug and the like. A plurality of outside air inlet holes 18 are formed in the back side panel. Pluralities of inside air outlet ports 17 and outside air inlet ports 18 are formed in a right-hand side panel and a left-hand side panel which constitute side panels of the housing.

Figure 2:
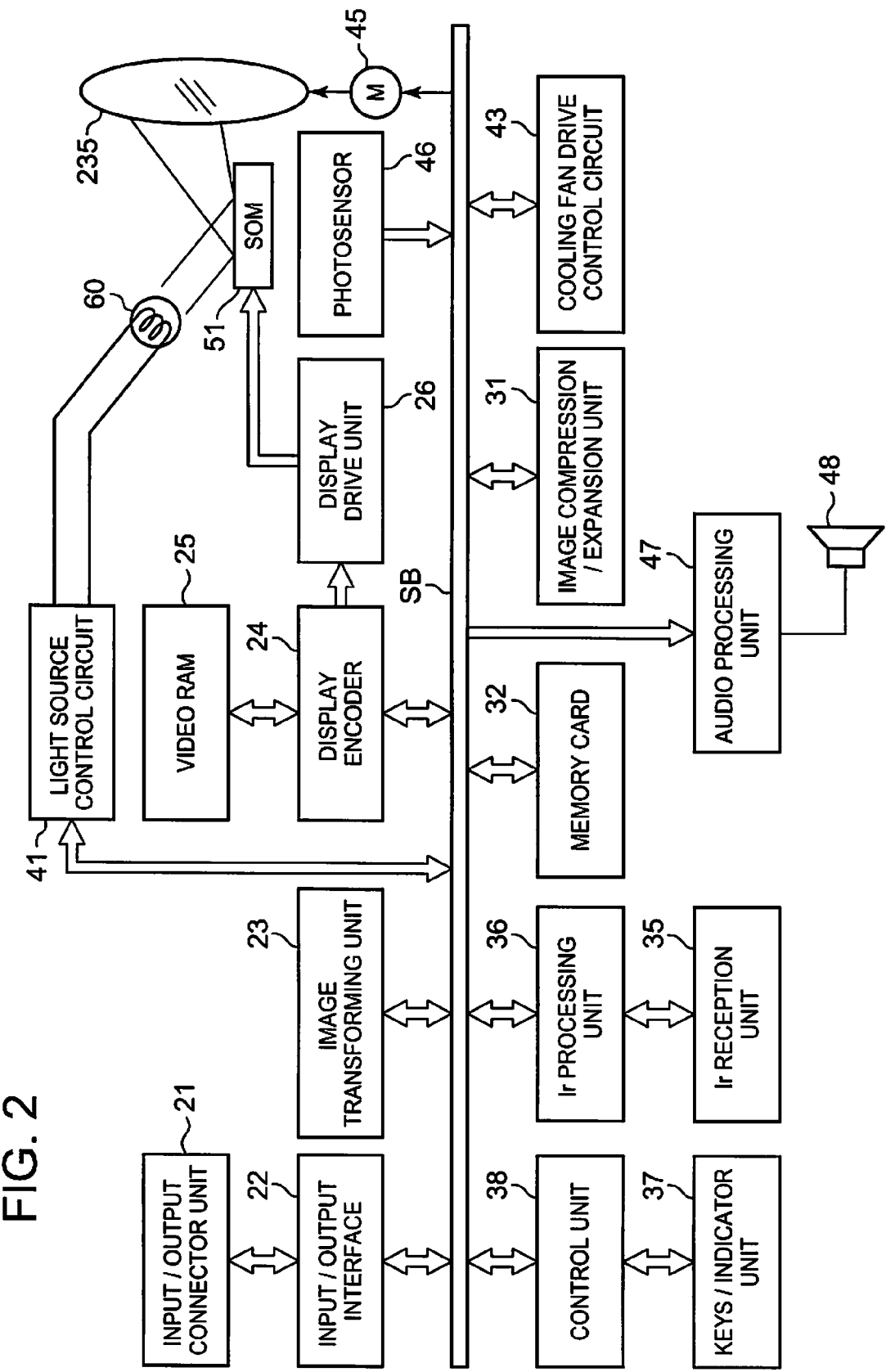
FIG. 2 is a functional block diagram of the projector according to the embodiment of the invention.

Next, a projector control unit of the projector 10 will be described by use of a block diagram in FIG. 2. The projector control unit includes a control unit 38, an input/output interface 22, an image transforming unit 23, a display encoder 24, a display drive unit 26 and the like. The control unit 38 governs the control of respective operations of circuitries within the projector 10 and is made up of a CPU, a ROM which stores in a fixed fashion operation programs of various types of settings and a RAM which is used as a work memory.

Image signals of various standards that are inputted from the input/output connector unit 21 are sent via the input/output interface 22 and a system bus (SB) to the image transforming unit 23 where the image signals are transformed so as to be unified into an image signal of a predetermined format which is suitable for display. Thereafter, the image signals so transformed are outputted to the display encoder 24.

In addition, the display encoder 24 deploys the image signals that have entered thereinto on a video RAM 25 for storage therein and generates a video signal from the contents stored in the video RAM 25, outputting the video signal so generated to the display drive unit 26.

The display drive unit 26 functions as a display device controller and drives a display device 51 which is a spatial optical modulator (SON) at an appropriate frame rate in response to the image signal outputted from the display encoder 24. A pencil of light which is emitted from a light source unit 60 is shone onto the display device 51 which is controlled by the display drive unit 26 via a light guiding optical system to thereby form an optical image based on reflected light reflected at the display device 51. The image so formed is then projected on to a screen, not shown, for display via a projection-side optical system, which will be described later. A movable lens group 235 of the projection-side optical system is driven by a lens motor 45 for zooming or focusing.

In addition, an image compression/expansion unit 31 performs a recording operation in which a luminance signal and a color difference signal of an image signal are data compressed through ADCT and Huffman coding and the compressed data is sequentially written on a memory card 32 which is configured as a detachable recording medium. Further, when in a reproducing mode, the image compression/expansion unit 31 reads out image data recorded on the memory card 32 and expands individual image data which make up a series of dynamic images frame by frame. Then, the image data is outputted to the display encoder 24 via the image transforming unit 23 so as to enable the display of dynamic images based on the image data stored on the memory card 32.

Operation signals generated at the keys/indicators unit 37 which is made up of the main keys and indicators provided on the upper side panel 11 of the housing are sent out directly to the control unit 38, while key operation signals generated by operating keys on the remote controller are received by the Ir reception unit 35, and a code signal demodulated at an Ir processing unit 36 is outputted to the control unit 38.

In addition, a audio processing unit 47 is connected to the control unit 38 via the system bus (SB). This audio processing unit 47 includes a sound source circuit such as a PCM sound source. When in a projection mode and a reproducing mode, the audio processing unit 47 converts voice data into analog signals and drives a speaker 48 to output loudly sound or voice based on the voice data.

Additionally, the control unit 38 controls a light source control circuit 41 which is configured as a light source control unit. This light source control circuit 41 controls the light source unit 60 so that light of a predetermined wavelength band which is required when images are reproduced is emitted from the light source unit 60. This light source unit 60 includes an excitation light shining device 70 which includes a laser light emitter functioning as an excitation light source 71, a luminescent light emitting device 100 which includes luminescent wheel 101, which will be described later, a red light source device 120 and a blue light source device 300.

Further, the control unit 38 is connected to a photosensor 46 for detecting light shone on to an optical path which is separated and changed by a partial light separation unit, which will be described later. Then, the control unit 38 functions as the light intensity determination unit for determining based on the light intensity output from the photosensor 46 whether light which is shone on to the mirror in which the partial light separation unit is provided is a laser light as coherent light or not. Thus, when light is shone on to the photosensor 46 and the control unit 38 determines that laser light as coherent light is shone on to the mirror as a result of a light intensity obtained exceeding a threshold, the control unit 38 controls the light source control circuit 41 which functions as the light source control unit so as to stop the emission of excitation light by the excitation light source 71.

An area sensor such as a CCD sensor or a CMOS sensor having a plurality of light receiving elements is used for the photosensor 46, thereby making it possible to measure a light intensity with good accuracy. Different light intensity outputs are outputted from the photosensor 46 depending upon whether or not the light received by the area sensor is laser light which is coherent light. Therefore, a threshold is set in advance to identify outputs from the photosensor 46. The control unit 38 determines that the light received is laser light as coherent light in the event that the light intensity obtained exceeds the threshold.

Note that a spot sensor such as a photodiode can be used for the photosensor 46 to measure a light intensity. As with when the area sensor is used, different light intensity outputs are outputted depending upon whether or not the light received by the spot sensor is laser light which is coherent light. Therefore, a threshold is set in advance to identify outputs from the photosensor 46. The control unit 38 determines that the light received is laser light as coherent light in the event that the light intensity obtained exceeds the threshold.

Further, the control unit 38 causes a cooling fan drive control circuit 43 to detect temperatures through a plurality of temperature sensors which are provided in the light source unit 60 and so forth so as to control the rotating speed of a cooling fan based on the results of the temperature detection. In addition, the control unit 38 also causes the cooling fan drive control circuit 43 to make the cooling fan continue to rotate even after the power supply of a projector main body is switched off by use of a timer or the like or to make the power supply to the projector main body be cut off depending upon the results of the temperature detection by the temperature sensors.

Figure 3:
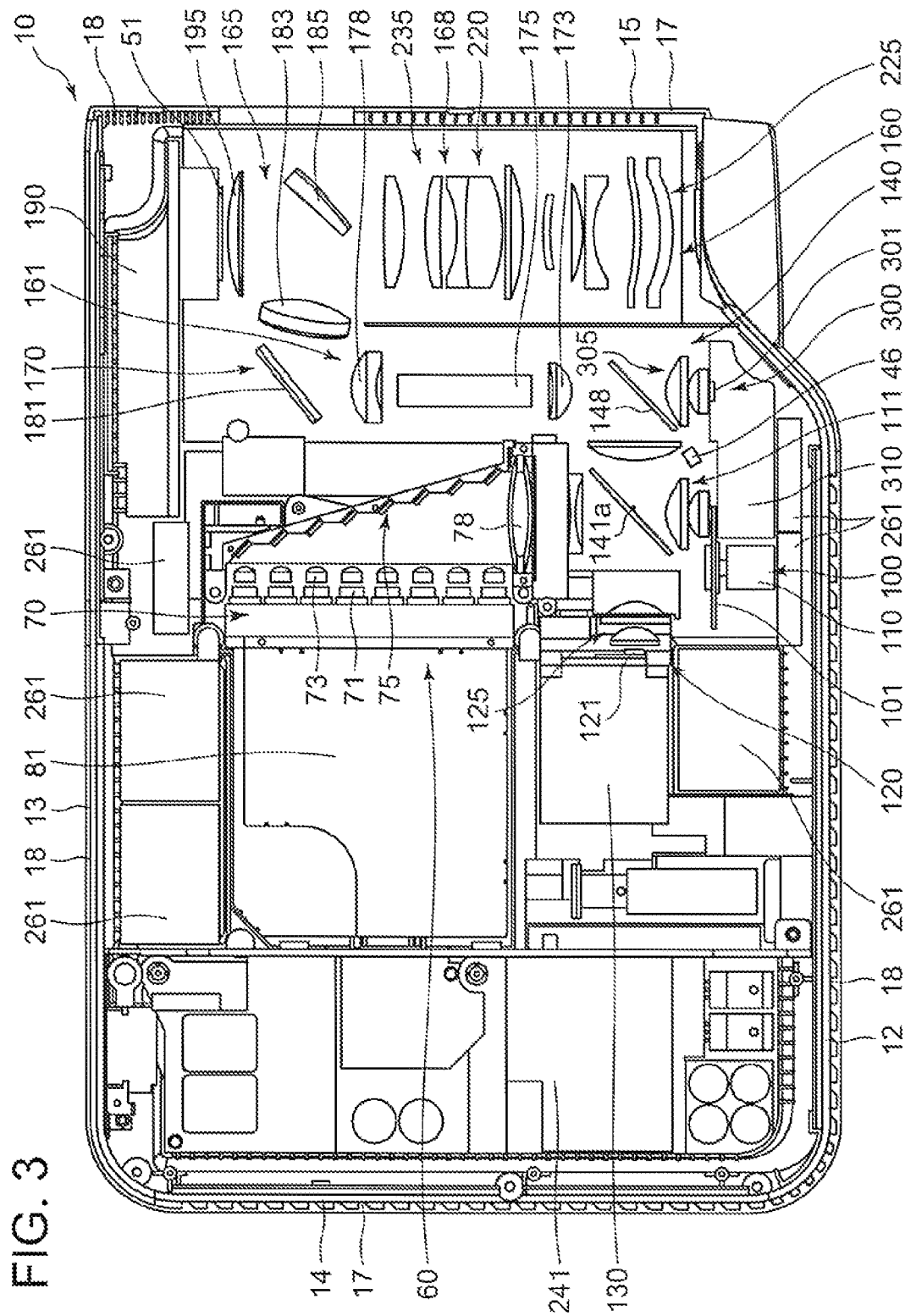
FIG. 3 is a plan exemplary diagram showing an interior construction of the projector according to the embodiment of the invention.

Next, an internal construction of the projector 10 will described. FIG. 3 is an exemplary plan view showing an internal construction of the projector 10. As is shown in FIG. 3, the projector 10 includes a control circuit board 241 which is disposed in proximity to the right-hand side panel 14. This control circuit board 241 includes a power supply circuit block or a light source control block. In addition, the projector 10 includes the light source unit 60 which is provided to a side of the control circuit board 241, that is, at a substantially central portion of the housing of the projector. Further, the projector 10 includes an optical system unit 160 which is disposed between the light source unit 60 and the left-hand side panel 15.

The light source unit 60 includes the excitation light shining device 70 which is disposed at a substantially central portion of the projector housing with respect to a left-to-right direction and which lies in proximity to the back panel 13, the luminescent light emitting device 100 which functions as a projection light producing device for converting laser light from the excitation light shining device 70 into projection light and which is disposed on an optical axis of a pencil of light emitted from the excitation light shining device 70 and in proximity to the front panel 12, the blue light source device 300 which is disposed in proximity to the front panel 12 so as to be in parallel with a pencil of light emitted from the luminescent light emitting device 100, a red light source device 120 which is disposed between the excitation light shining device 70 and the luminescent light emitting device 100, and a light source side optical system 140 which changes optical axes of rays of light emitted from the luminescent light emitting device 100, the red light source device 120 and the blue light source device 300 so that the respective optical axes of the rays of light converge to the same optical axis so as to collect the respective colored rays of light on to an incident opening of a light tunnel 175 which constitutes a predetermined plane. This light source side optical system 140 forms part of the light guiding optical system 170.

In this way, the light source side optical system 140 forms a projection optical path for guiding lights emitted from the luminescent light emitting device 100, the red light source device 120 and the blue light source device 300 to the display device 51 and making an image conspicuous. In addition, although a detailed configuration will be described later, the light source side optical system 140 also forms a determination optical path for determining whether or not light emitted from the luminescent light emitting device 100 is laser light which is coherent light which is not diffused.

The excitation light shining device 70 includes the excitation light source 71 which is made up of a semiconductor light emitting element which is disposed so that an optical axis of light emitted therefrom becomes parallel to the back panel 13, a reflecting mirror group 75 which changes the optical axis of the light emitted from the excitation light source 71 through 90 degrees so as to be oriented towards the direction of the front panel 12, a collective lens 78 for collecting the light emitted from the excitation light source 71 and reflected on the reflecting mirror group 75 and a heat sink 81 which is disposed between the excitation light source 71 and the right-hand side panel 14.

The excitation light source 71 includes a plurality of blue laser light emitters which are arranged into a matrix configuration or 24 semiconductor light emitting elements which are arranged into three rows and eight columns, and collimator lenses 73 are disposed individually on optical axes of the blue laser light emitters so as to convert light emitted from the respective blue laser light emitters into parallel light. In the reflecting mirror group 75, a plurality of reflecting mirrors are arranged in a step-like fashion so as to emit pencils of light emitted from the excitation light source 71 towards the collective lens 78 while reducing sectional areas of the pencils of light so emitted in one direction.

A cooling fan 261 is disposed between the heat sink 81 and the back panel 13, and the excitation light source 71 is cooled by the cooling fan 261 and the heat sink 81. Further, a cooling fan 261 is also disposed between the reflecting mirror group 75 and the back panel 13, and the reflecting mirror group 75 and the collective lens 78 are cooled by the cooling fan 261.

The luminescent light emitting device 100 is the projection light producing device for converting laser light into projection light and includes the luminescent wheel 101 which is disposed so as to be parallel to the front panel 12, that is, so as to be at right angles to the optical axis of the light emitted from the excitation light shining device 70, a wheel motor 110 which drives the luminescent wheel 101 to rotate and a collective lens group 111 which collects pencils of light emitted from the luminescent wheel 101 in the direction of the back panel 13.

The luminescent wheel 101 is a circular disc-shaped metallic base. An annular luminescent light emitting area is formed on the luminescent wheel 101 as a recess portion. This annular luminescent light emitting area receives the light emitted from the excitation light source 71 as excitation light so as to emit luminescent light of a green wavelength band. The luminescent wheel 101 functions as a luminescent plate which receives excitation light to emit luminescent light. A surface of an excitation light source 71 side of the luminescent wheel 101 which includes the luminescent light emitting area is mirror finished through silver deposition or the like to thereby form a reflecting surface thereon which reflects light. Then, a green luminescent material layer is laid on this reflecting surface.

Light emitted from the excitation light shining device 70 and shone onto the green luminescent material layer of the luminescent wheel 101 excites a green luminescent material in the green luminescent material layer. Pencils of luminescent light which are emitted by luminescence in every direction from the green luminescent material are emitted directly towards the excitation light source 71 or are reflected on the reflecting surface of the luminescent wheel 101 so as to then be emitted towards the excitation light source 71. Excitation light which is shone onto the metallic base without being absorbed by the luminescent material in the luminescent material layer is reflected on the reflecting surface so as to enter the luminescent material layer again to excite the luminescent material layer. Consequently, by making a surface of the recess portion of the luminescent wheel 101 into the reflecting surface, the utilization efficiency of excitation light emitted from the excitation light source 71 can be increased, thereby making it possible to enable the luminescent wheel 101 to luminesce more brightly.

In excitation light which is reflected towards the luminescent material layer on the reflecting surface of the luminescent wheel 101, excitation light emitted towards the excitation light source 71 without being absorbed by the luminescent material passes through a primary dichroic mirror 141, which will be described later, while luminescent light is reflected by the primary dichroic mirror 141. Thus, there is no such situation that excitation light is emitted to the outside of the light source unit 60. Then, a cooling fan 261 is disposed between the wheel motor 110 and the front panel 12, whereby the luminescent wheel 101 is cooled by this cooling fan 261.

The red light source device 120 includes a red light source 121 which is disposed so that its optical axis becomes parallel to the excitation light source 71 and a collective lens group 125 which collects light emitted from the red light source 121.

This red light source device 120 is disposed so that its optical axis intersects light emitted from the excitation shining device 70 and luminescent light of green wavelength band emitted from the luminesce wheel 101 at right angles. The red light source 121 is a red light emitting diode which is a semiconductor light emitting device which emits light of red wavelength band. The red light source device 120 includes a heat sink 130 which is disposed on a side of the red light source 121 which faces the right-hand side panel 14. A cooling fan 261 is disposed between the heat sink 130 and the front panel 12, whereby the red light source 121 is cooled by this cooling fan 261.

The blue light source device 300 includes a blue light source 301 which is disposed so as to be parallel to an optical axis of luminescent light emitted from the luminescent light emitting device 100 and a collective lens group 305 which collects light emitted from the blue light source 301. This blue light source device 300 is disposed so that its optical axis intersects light emitted from the red light source device 120. The light source 301 is a blue light emitting oscillator which is a semiconductor light emitting device which emits light of blue wavelength band. The blue light source device 300 includes a heat sink 310 which is disposed on a side of the blue light source 301 which faces the front panel 12. A cooling fan 261 is disposed between the heat sink 310 and the front panel 12, whereby the blue light source 301 is cooled by this cooling fan 261.

The light source side optical system 140 includes a collective lens which collects pencils of light of red, green and blue wavelength bands and a dichroic mirror which changes optical axes of the pencils of light of the respective wavelength bands so that the pencils of light converge to the same optical axis and forms the projection optical path. Specifically, the primary dichroic mirror 141 is disposed in a position where the optical axes of the light of blue wavelength band emitted from the excitation light shining device 70 and the light of green wavelength band emitted from the luminescent wheel 101 intersect the optical axis of the light of red wavelength band emitted from the red light source device 120. This primary dichroic mirror 141 transmits the light of blue wavelength band and the light of red wavelength band and reflects the light of green wavelength band so as to change the optical axis of the light of green wavelength band through 90 degrees in the direction of the left-hand side panel 15.

This primary dichroic mirror 141 is a mirror which reflects luminescent light emitted from the luminescent wheel 101 by shining rays of light from the laser light emitters on to the luminescent material layer of the luminescent wheel 101. The primary dichroic mirror 141 includes a partial light separation unit for separating and changing part of light on the projection optical path which is a minute amount of light in the light shone on to the mirror in the light shone on to a central portion of the mirror. This partial light separation unit is a reflection angle changing portion 141a for separating and changing the projection optical path and is a member having a different reflection angle from that of the primary dichroic mirror 141. Then, light reflected by the reflection angle changing portion 141a is shone on to the photosensor 46.

Namely, this reflection angle changing portion 141a, which is the partial light separation unit, reflects part of light on the projection optical path which is a normal optical path for projecting an image in the light source side optical system 140 so as to guide the light to an optical path from the partial light separation unit to the photosensor 46 (hereinafter, referred to as a determination optical path). This reflection angle changing portion 141a is formed in a spot area which indicates an illumination area of laser light on the primary dichroic mirror in an abnormal situation in which laser light is emitted from the laser light emitters and is then reflected on the luminescent wheel 101 as a result of the luminescent material layer, for example, falling or being detached.

A secondary dichroic mirror 148 is disposed in a position where the optical axis of light of blue wavelength band emitted from the blue light source device 300 and the optical axis of light of red wavelength band emitted from the red light source device 120 intersect each other. This secondary dichroic mirror 148 transmits light of blue wavelength band and reflects light of green wavelength band and light of red wavelength band so as to change the optical axes of the light of green wavelength band and the light of red wavelength band through 90 degrees in the direction of the back panel 13. A collective lens is disposed between the primary dichroic mirror 141 and the secondary dichroic mirror 148. Further, a collective lens 173 is disposed in proximity to the light tunnel 175 for collecting light source light to the incident opening of the light tunnel 175.

The optical system unit 160 has a substantially U-shape and includes three blocks such as an illumination-side block 161 which is positioned to a left-hand side of the excitation light shining device 70, an image generation block 165 which is positioned in proximity to a position where the back panel. 13 and the left-hand side panel 15 intersect each other, and a projection-side block 168 which is positioned between the light source side optical system 140 and the left-hand side panel 15.

The illumination-side block 161 includes part of a light guiding optical system 170 which forms the projection optical path along which light source light emitted from the light source unit 60 is guided to the display device 51 which is included in the image generation block 161. As the light guiding optical system 170 that is included in the illumination-side block 161, there are included the light tunnel 175 which converts a pencil of light emitted from the light source unit 60 into a pencil of light whose intensity distribution is uniform, a collective lens 178 which collects light, emitted from the light tunnel 175, an optical axis changing mirror 181 which changes optical axes of pencils of light emitted from the light tunnel 175 in the direction of the image generation block 165 and the like.

The image generating block 165 has, as the light guiding optical system 170, a collective lens 183 which collects light source light which is reflected by the optical axis changing mirror 181 to the display device 51 and a shining mirror 185 which shines a pencil of light which has passed through the collective lens 183 onto the display device 51 at a predetermined angle. Further, the image generation block 165 includes a DMD which is the display device 51. A heat sink 190 is disposed between the display device 51 and the back panel 13 for cooling the display device 51. Thus, the display device 51 is cooled by this heat sink 190. A collective lens 195, which functions as a projection-side optical system 220, is disposed in proximity to a front of the display device 51.

The projection-side block 168 has a lens group of the projection-side optical system 220 which projects on-light reflected by the display device 51 onto the screen. The projection-side optical system 220 is configured as a variable focus lens including a fixed lens group 225 which is incorporated in a fixed lens barrel and a movable lens group 235 which is incorporated in a movable lens barrel, whereby the variable focus lens enables zooming and focusing operations by moving the movable lens group 235 by a lens motor.

Figure 4:
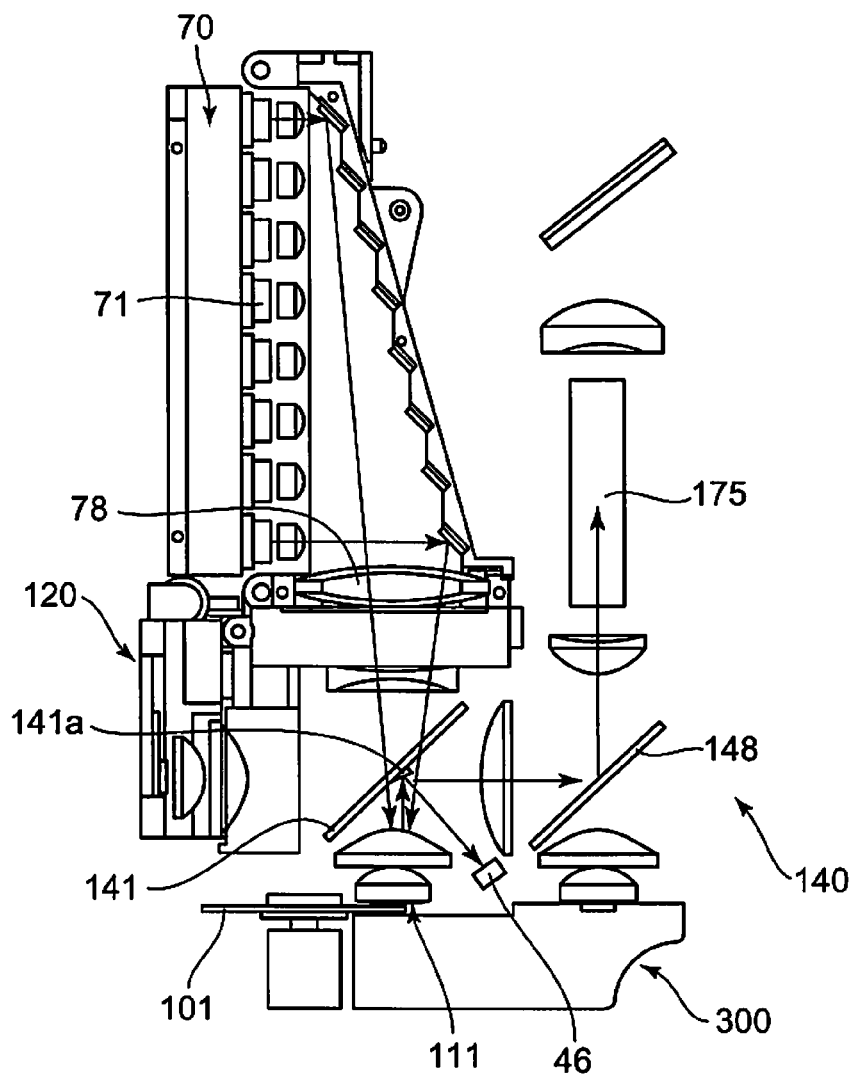
FIG. 4 is an explanatory diagram of a configuration for detecting laser light of the projector according to the embodiment of the invention.

Here, the projector 10 will be described in detail by using FIG. 4 which determines whether or not light emitted is laser light as coherent light by the reflection angle changing portion 141a which is the partial light separation unit in this embodiment and the photosensor 46. FIG. 4 is a drawing which shows the light source side optical system 140 which guides light emitted from the laser light emitters which constitute the excitation light source 71 to the light tunnel 175 and an optical path of the light source side optical system 140.

As is shown in FIG. 4, in this light source side optical system 140, excitation light generated by the plurality of laser light emitters is shone on to the luminescent wheel 101 via the collective lens 78, the primary dichroic mirror 141 and the collective lens group 111. Then, light emitted from the excitation light shining device 70 which is shone on to the green luminescent material layer of the luminescent wheel 101 excites the green luminescent material in the green luminescent material layer, whereby the laser light as coherent light is converted into incoherent light and the incoherent light is emitted directly towards the excitation light source 71 or is reflected by the luminescent wheel 101 and is then emitted towards the excitation light source 71. Then, the light of green wavelength band which is reflected towards the excitation light source 71 is reflected by the primary dichroic mirror 141 and the secondary dichroic mirror 148 so as to be guided towards the light tunnel 175.

The projector 10 of this embodiment detects that there occurs no abnormality such as the fall or detachment of the luminescent material of the luminescent wheel 101 and that the light emitted from the luminescent wheel 101 towards the excitation light source 71 is converted appropriately from the laser light as coherent light to incoherent light.

Then, in order to guide part of the light which is reflected by the primary dichroic mirror 141 so as to be guided towards the light tunnel 175 to the determination optical path which is different from the projection optical path, the reflection angle changing portion 141a, which is the partial light separation unit, is provided at the central portion of the primary dichroic mirror 141 so that the projection optical path for part of the light shone on to the primary dichroic mirror 141 is separated and changed. Then, the photosensor 46 such as a COD is provided in a position laying at the destination of the determination optical path, which is the optical path for the light which is separated and changed, so as to measure a light intensity of the light which is separated and changed. The control unit 38, which functions as a light intensity determination unit, determines that the light is laser light in the event that the output of light intensity exceeds a predetermine threshold.

As has been described earlier, the control unit 38 controls the emissions of the light sources such as the red light source device 120, the blue light source device 300 and the excitation light shining device 70 which is made up of the plurality of laser light emitters via the light source control circuit 41 in time series. Consequently, the control unit 38 obtains the result of a detection of light intensity by the photosensor 46 only when excitation light is shone by the laser light emitters.

Note that the reflection angle changing portion 141a, which is the partial light separation unit, may be provided not at the central portion of the primary dichroic mirror 141 but at a portion on the projection optical path which is offset from the center of the primary dichroic mirror 141, for example, so as to be able to detect part of light at a circumferential edge portion of light shone which is diffused as a result of being converted into incoherent light. As this occurs, the reflection angle changing portion 141a needs to be formed in any other positions than the spot area of laser light on the primary dichroic mirror 141 which results when the laser light is emitted abnormally from the laser light emitters. Then, light which is reflected by the reflection angle changing portion 141a which is provided at the portion which is offset from the center is caused to be shone on to the photosensor 46, which is made up of a spot sensor like a photodiode or an area sensor like a CCD. In the event that an output of light intensity obtained exceeds the predetermined threshold, the control unit 38, which functions as the light intensity determination unit, can determine that incoherent light is normally shone on to the primary dichroic mirror 141.

Then, even though the partial light separation unit and the photosensor 46 are located in either of the positions, in the event that a predetermined sensor output indicating incoherent is not obtained at a timing when incoherent light is to be shone on to the primary dichroic mirror 141, the control unit 38 stops the emissions of the laser light emitters by controlling the light source control circuit 41, which functions as the light source control unit, based on the result of the determination.

Consequently, the control unit 38 can prevent the occurrence of unnecessary shining of light within the projector by stopping the emissions of the laser light emitters in the way described above even when the luminescent material layer is damaged and light emitted from the excitation light shining device 70 which is reflected on the reflecting surface of the luminescent wheel 101 passes through the primary dichroic mirror 141 to return towards the excitation light shining device 70, whereby laser light, which is coherent light, is shone on to a member on to which laser light, which is coherent light, is not to be shone.

Figure 5:
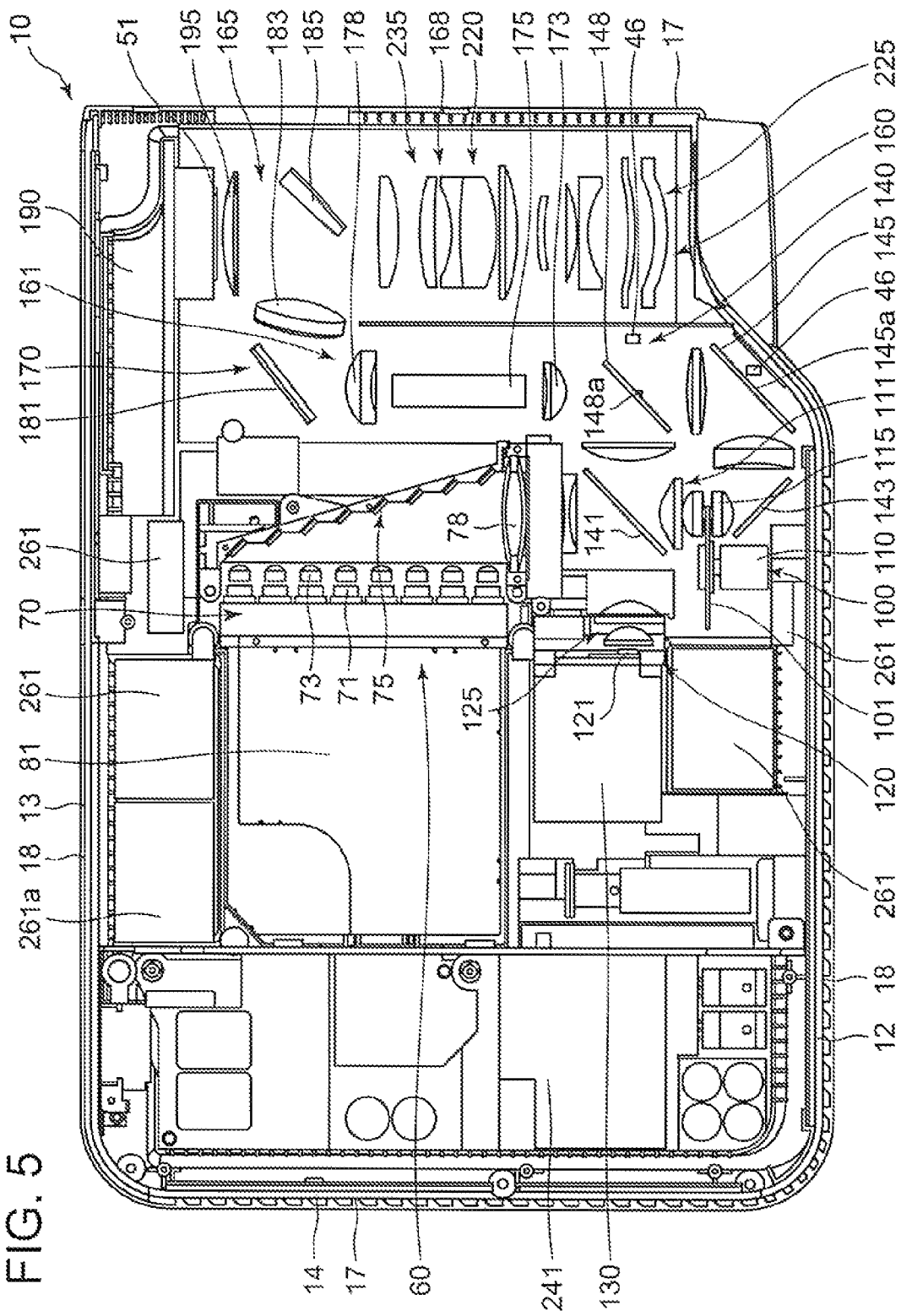
FIG. 5 is a plan exemplary diagram showing an interior construction of a projector according to a modified example of the embodiment of the invention.
Figure 6:
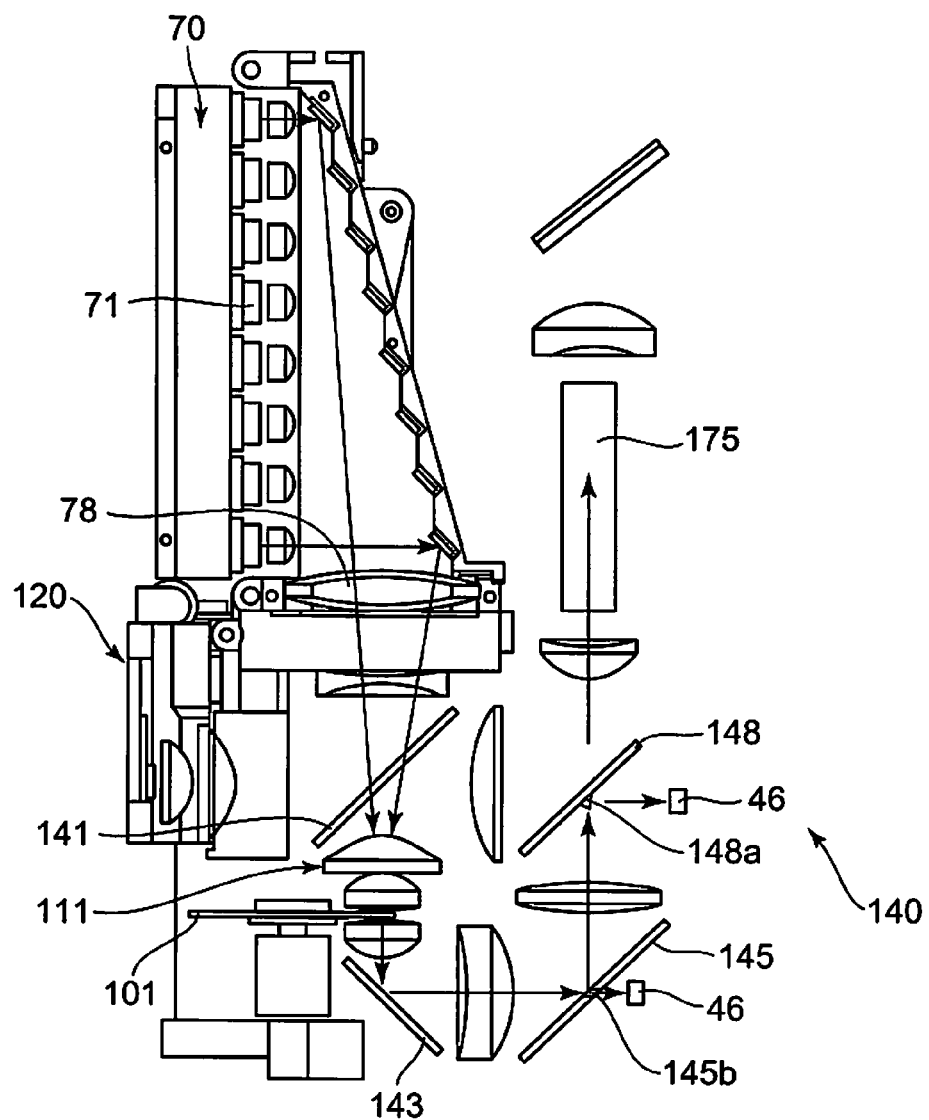
FIG. 6 is an explanatory diagram of a configuration for detecting laser light of the projector according to the modified example of the embodiment of the invention.

In addition, a case will be described by reference to FIGS. 5, 6 in which the invention is applied to a projector 10 adopting a different light source side optical system 140 as a modified example to the light source side optical system 140 of the embodiment. Note that like reference numerals will be given to like portions of the projector 10 of the modified example to those of the previous projector 10, and the description thereof will be omitted. FIG. 5 is a plan exemplary diagram showing an interior construction of a projector 10 having a light source side optical system 140 according to a modified example to the embodiment. In addition, FIG. 6 is a diagram showing the light source side optical system 140 which guides light generated by laser light emitters to a light tunnel 175 and an optical path thereof. As is shown in FIG. 5, the projector 10 includes a light source unit 60 at a substantially central portion of a housing of the projector.

As is shown in FIG. 5, the light source unit 60 includes an excitation light shining device 70 which is disposed at a substantially central portion of the projector housing with respect to a left-to-right direction which lies in proximity to a back panel 13, a luminescent light emitting device 100 which is disposed on an optical axis of a pencil of light emitted from the excitation light shining device 70 and in proximity to the front panel 12, a red light source device 120 which is disposed between the excitation light shining device 70 and the luminescent light emitting device 100, and a light source side optical system 140 which changes optical axes of rays of light emitted from the luminescent light emitting device 100 and the red light source device 120 so that the respective optical axes of the rays of light converge to the same optical axis so as to collect the respective colored rays of light on to an incident opening of a light tunnel 175 which constitutes a predetermined plane. It will be true with the embodiment descried above that this light source side optical system 140 forms part of a light guiding optical system 170.

In this way, the light source side optical system 140 forms a projection optical path for guiding light emitted from the luminescent light emitting device 100 and the red light source device 120 to a display device 51 and making an image conspicuous. In addition, although a detailed configuration will be described later, the light source side optical system 140 also forms a determination optical path for determining whether or not light emitted from the luminescent light emitting device 100 is laser light which is coherent light. The luminescent light emitting device 100 includes luminescent wheel 101 which is disposed so as to be parallel to a front panel 12, that is, so as to be at right angles to the optical axis of light emitted from the excitation light shining device 70, a wheel motor 110 which drives the luminescent wheel 101 to rotate, a collective lens group ill which not only collects pencils of light emitted from the excitation light shining device 70 to the luminescent wheel 101 but also collects pencils of light emitted from the luminescent wheel 101 in the direction of the back panel 13, and a collective lens 115 which collects pencils of light emitted from the luminescent wheel 101 in the direction of the front panel 12.

In the luminescent wheel 101, a green luminescent light emitting area which receives light emitted from the excitation light shining device 70 as excitation light to emit luminescent light of green wavelength band and a diffusive transmitting area which transmits light emitted from the excitation light shining device 70 in a diffused fashion are laid end to end in a circumferential direction. In addition, a base in the green luminescent light emitting area is a metallic base made of copper or aluminum. A surface of the base which faces the back panel 13 is mirror finished through silver deposition, and a green luminescent material layer is laid on this mirror-finished surface. Furthermore, a diffusion plate in the diffusive transmitting area is a transparent substrate having light transparent property and minute irregularities are applied on a surface of the substrate by sandblasting or the like.

Light emitted from the excitation light shining device 70 and shone onto the green luminescent material layer of the luminescent wheel 101 excites a green luminescent material in the green luminescent material layer. Pencils of luminescent light which are emitted by luminescence in every direction from the green luminescent material are emitted directly towards the back panel 13 or are reflected on the surface of the luminescent wheel 101 so as to then be emitted towards the back panel 13 to thereby be incident on the collective lens group 111. In addition, light emitted from the excitation light shining device 70 which is shone on to the diffusive transmitting area of the luminescent wheel 101 is incident on the collective lens 115 as diffused transmission light which is diffused by minute irregularities. Additionally, a cooling fan 261 is disposed between the wheel motor 110 and the front panel 12, and the luminescent light emitting device 100 and the like are cooled by this cooling fan 261.

The light source side optical system 140 includes a collective lens which collects pencils of light of red, green and blue wavelength bands, and a reflecting mirror and a dichroic mirror which change optical axes of pencils of light of red, green and blue wavelength bands so as to converge to the same optical axis. Specifically, a primary dichroic mirror 141 is disposed in a position where light of blue wavelength band which is emitted from the excitation light shining device 70 and light of green wavelength band which is emitted from the luminescent wheel 101 intersect light of red wavelength band which is emitted from the red light source device 120. This primary dichroic mirror 141 transmits the light of blue wavelength band and the light of red wavelength band and reflects the light of green wavelength band so as to change the optical axis of the light of green wavelength band through 90 degrees in the direction of the left-hand side panel 15.

In addition, a primary reflecting mirror 143 is disposed on the optical axis of light of blue wavelength band which passes in a diffused fashion through the luminescent wheel 101, that is, between the collective lens 115 and the front panel 12, and this primary reflecting mirror 143 reflects light of blue wavelength band and changes the optical axis of the blue light through 90 degrees in the direction of a left-hand side panel 15. Further, a secondary reflecting mirror 145 is disposed on the optical axis of the light of blue wavelength band which is reflected on the primary reflecting mirror 143 and in proximity to an optical system unit 160, and this secondary reflecting mirror 145 changes the optical axis of the light of blue wavelength band through 90 degrees in the direction of the back panel 13.

Additionally, a secondary dichroic mirror 148 is disposed in a position where the optical axis of the light of red wavelength band which passes through the primary dichroic mirror 141 and the optical axis of the light of green wavelength band which is reflected by the primary dichroic mirror 141 so as to coincide with the optical axis of the light of red wavelength band intersect the optical axis of the light of blue wavelength band which is reflected by the second reflecting mirror 145. This secondary dichroic mirror 148 transmits light of blue wavelength band and reflects light of red wavelength band and light of green wavelength band so as to change the optical axes of the light of red wavelength band and the light of green wavelength band through 90 degrees in the direction of the back panel 13. Collective lenses are disposed individually between the dichroic mirrors and the reflecting mirrors. Further, a collective lens 173 is disposed in proximity to the light tunnel 175, and this collective lens 173 collects light source light to an incident opening of the light tunnel 175.

As is shown in FIG. 6, in this light source side optical system 140, excitation light emitted from the plurality of laser light emitters is shone on to the luminescent wheel 101 via a collective lens 78, the primary dichroic mirror 141, the collective lens group 111 and the like. Then, the light emitted from the excitation light shining device 70 which is shone on to the diffusive transmitting layer of the luminescent wheel 101 is diffused by the diffusive transmitting layer to thereby be converted from laser light, which is coherent light, into incoherent light and is then emitted towards the primary reflecting mirror 143. Then, the light of blue wavelength band which is emitted towards the primary reflecting mirror 143 is reflected by the primary reflecting mirror 143 so that its optical axis is changed through 90 degrees so as to be guided to the secondary reflecting mirror 145.

Then, a transmitting portion 145b, which functions as a partial light separation unit for allowing a minute amount of light to be emitted, is provided at a central portion of the secondary reflecting mirror 145 so that part of light which is reflected by the secondary reflecting mirror 145 so as to be guided towards the light tunnel 175 is guided to a determination optical path which is different from a projection optical path. Then, a photosensor 46 made up of a CCD or the like is provided in a position lying at the destination of light that has passed through the transmitting portion 145b of the secondary reflecting mirror 145.

Namely, the transmitting portion 145b functioning as the partial light separation unit does not reflect but transmits part of light on the projection optical path, which is the normal optical path for projecting an image in the light source side optical system 140 so as to guide the part of the light to the determination optical path which extends from the partial light separation unit to the photosensor 46. Note that this transmitting portion 145b is formed in a spot area on the secondary reflecting mirror 145 which indicates an area on to which laser light is shone in an abnormal situation in which laser light is emitted from laser light emitters and a diffusion plate falls or is detached.

The control unit 38 controls the emissions of the light sources such as the red light source device 120 and the excitation light shining device 70 via the light source control circuit 41 in time series. Consequently, the control unit 38 measures a light intensity by the photosensor 46 made up of a COD or the like only when excitation light is shone by the laser light emitters.

Note that the transmitting portion 145b, which is the partial light separation unit, may be provided not at the central portion of the secondary reflecting mirror 145 but at a portion which is offset from the center of the secondary reflecting mirror, for example, so as to be able to detect part of light at a circumferential edge portion of light shone. As this occurs, the transmitting portion 145b needs to be formed in any other positions than the spot area of laser light on the secondary reflecting mirror 145 which results when the laser light is emitted abnormally from the laser light emitters. Then, light which is emitted by the transmitting portion 145b which is provided at the portion which is offset from the center is detected by the photosensor 46 which is made up of a spot sensor like a photodiode or an area sensor like a CCD. In the event that an output of light intensity obtained exceeds a predetermined threshold, the control unit 38, which functions as the light intensity determination unit, can determine that the laser light is converted normally into incoherent light.

In addition, in the event that it is determined that laser light as coherent light is shone on to the secondary reflecting mirror 145, the control unit 38 controls the light source control circuit 41, which is the light source control unit, based on the result of the determination and then stops the emissions of the laser light emitters.

In the projector 10 according to the modified example, the partial light separation unit and the photosensor 46 can be disposed in other locations. As is shown in FIG. 6, light of blue wavelength band reflected by the secondary reflecting mirror 145 passes through the secondary dichroic mirror 148 so as to be guided to the light tunnel 175.

Namely, a reflection angle changing portion 148a, which functions as a partial light separation unit, is provided on the secondary dichroic mirror 148 so that part of light shone on to the second dichroic mirror 148 is separated and changed from the projection optical path. Then, a photosensor 46 made up of a CCD or the like is provided at the destination of the optical path which is so changed. Then, as is described earlier, with this reflection angle changing portion 148a formed in a spot area resulting in the abnormal situation, the control unit 38 determines that the light shone is laser light as coherent light in the event that a light intensity of the light detected exceeds a predetermined threshold.

Thus, as has been described heretofore, according to the invention, there can be provided the projector 10 in which the partial light separation unit is provided so that part of light is shone on to the determination optical path which is different from the projection optical path which makes projection light conspicuous, and the photosensor 46 is provided in the area on to which the part of the light is to be shone so that it is determined that the light shone on to the dichroic mirror or the like is laser light as coherent light based on the output of light intensity so as to detect abnormality, whereby the laser light can easily be prevented from being shone on to any other positions than the predetermined optical path within the projector or leaks out.

Figure 7:
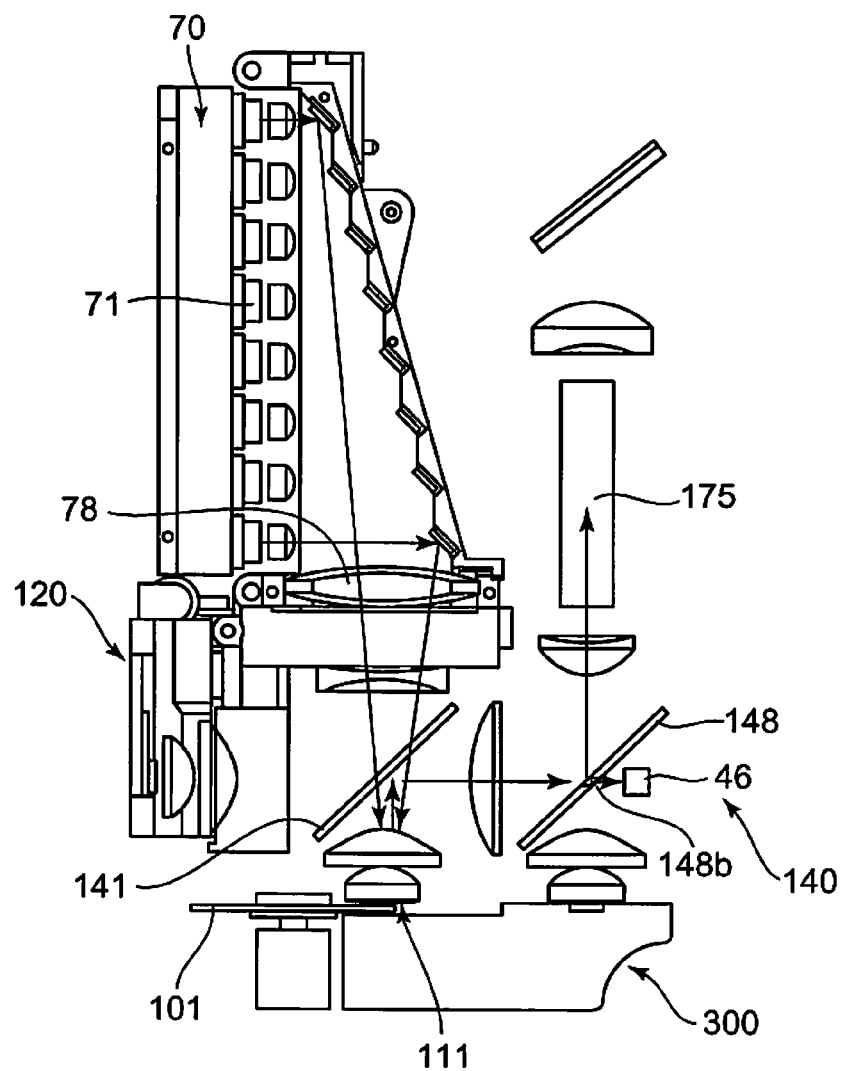
FIG. 7 is an explanatory diagram of a configuration for a partial light separation unit which is disposed in a predetermined position on the projection optical path for reflecting or transmitting part of light emitted from the projection light producing device of the light source unit to separate it to a different optical path from the projection optical path, a photosensor which is disposed on the optical path which is separated and changed by the partial light separation unit, a light intensity determination unit for detecting a light intensity of the laser light separated by the partial light separation unit by the photosensor to determine whether or not the light intensity so detected exceeds a threshold, and a light source control unit for stopping the emission of laser light by the laser light emitter based on the result of the determination by the light intensity determination unit.

In addition, in the light source optical system of the projector 10 shown in FIG. 4, as is shown in FIG. 7 transmitting portion 148*b* may be provided as a partial light separation unit in place of the reflection angle changing portion 141*a*. As this occurs, the light transmitting portion 148*b* as the partial light separation unit is provided at a central portion of the secondary dichroic mirror 148 so as to allow a minute amount of light to be emitted. Then, the photosensor 46 made up of a CCD or the like is provided in a position lying at the destination of light which passes through the transmitting portion 148*b*.

Additionally, according to the invention, the transmitting portion 145*b*, 148*b* or the reflection angle changing portion 141*a*, 148*a* is provided in the spot area of the mirror which reflects or transmits luminescent light or diffused light. Then, the optical path for the part of the light which is shone on to the mirror is separated and changed from the projection optical path so that the part of the light is shone on to the photosensor 46 made of a CCD or the like for determination on whether or not the light concerned is laser light as coherent light. Thus, the detection unit can be made compact with the simple construction, and the determination on whether or not light concerned is laser light as coherent light can be determined with good accuracy.

Further, according to the invention, the transmitting portion 145*b*, 148*b* or the reflection angle changing portion 141*a*, 148*a* is provided in any other position than the spot area on the projection optical path of the mirror which reflects or transmits luminescent light or diffused light. Then, the optical path for the part of the light which is shone on to the mirror is separated and changed from the projection optical path so that the part of the light is shone on to the photosensor 46 made of a photodiode or the like for determination on whether or not the light concerned is laser light as coherent light. Thus, it can be determined with the inexpensive system and with better efficiency that light concerned is laser light as coherent light.

In addition, in the embodiment, while the partial light separation unit is configured so as to be disposed on the primary dichroic mirror 141, the secondary dichroic mirror 148 or the secondary reflecting mirror 145, the invention is not limited thereto. For example, a prism can also be used in place of these mirrors. As this occurs, by providing the reflection angle changing portion 141*a*, 148*a* or the transmitting portion 145*b*, 148*b* on the prism, the same advantage as that of the embodiment can be obtained.

Additionally, the invention is not limited to the embodiment that has been described heretofore but can be modified variously in various stages at which the invention is carried out without departing from the spirit and scope thereof. As many functions as possible of the functions which are executed in the embodiment may be combined in appropriate fashions. The embodiment includes various stages, and various inventions can be extracted by combining appropriately a plurality of constituent requirements disclosed therein. For example, even in the event that some constituent requirements are deleted from the whole constituent requirements disclosed in the embodiment, as long as the advantage can be obtained, a configuration resulting from the deletion of the constituent requirements can be extracted as an invention.

What is claimed is:

1. A projector comprising:
   a light source unit having a laser light emitter for emitting laser light and a projection light producing device for converting the laser light into projection light;
   a display unit;
   a light guiding optical system which forms a projection optical path along which light from the light source unit is guided to the display device;
   a partial light separation unit which is disposed in a predetermined position on the projection optical path and which reflects or transmits part of light emitted from the projection light producing device of the light source unit so as to separate the part of the light to an optical path which is different from the projection optical path;
   a photosensor which is disposed on the optical path which is separated and changed by the partial light separation unit;
   a light intensity determination unit which detects a light intensity of the laser light which is separated by the partial light separation unit so as to determine whether or not the light intensity exceeds a threshold; and
   a light source control unit which stops the emission of the laser light emitter based on a result of the determination of the light intensity determination unit;
   wherein the partial light separation unit separates and changes an optical path for part of light shone on to a mirror which reflects or transmits light emitted from the projection light producing device of the light source unit by providing a light transmitting portion or a reflection angle changing portion in a spot area of the laser light on the mirror.

2. The projector as set forth in claim 1, wherein when the result of the determination of the light intensity determination unit exceeds the threshold, the light source control unit stops the emission of the laser light emitter.

3. A projector comprising:
   a light source unit having a laser light emitter for emitting laser light and a projection light producing device for converting the laser light into projection light;
   a display unit;
   a light guiding optical system which forms a projection optical path along which light from the light source unit is guided to the display device;
   a partial light separation unit which is disposed in a predetermined position on the projection optical path and which reflects or transmits part of light emitted from the projection light producing device of the light source unit so as to separate the part of the light to an optical path which is different from the projection optical path;
   a photosensor which is disposed on the optical path which is separated and changed by the partial light separation unit;
   a light intensity determination unit which detects a light intensity of the laser light which is separated by the partial light separation unit so as to determine whether or not the light intensity exceeds a threshold; and
   a light source control unit which stops the emission of the laser light emitter based on a result of the determination of the light intensity determination unit;
   wherein the partial light separation unit separates and changes an optical path for part of light shone on to a mirror which reflects or transmits light emitted from the projection light producing device of the light source unit by providing a light transmitting portion or a reflection angle changing portion in any other position other than a spot area of the laser light on the mirror.

4. The projector as set forth in claim 3, wherein when the result of the determination by the light intensity determination unit is less than the threshold, the light source control unit stops the emission of the laser light emitter.

5. The projector as set forth in claim 1, wherein the photosensor comprises a CCD sensor or a CMOS sensor.

6. The projector as set forth in claim 4, wherein the photosensor comprises a photodiode.

* * * * *

UNITED STATES PATENT AND TRADEMARK OFFICE
CERTIFICATE OF CORRECTION

| | | |
|---|---|---|
| PATENT NO. | : 8,556,433 B2 | |
| APPLICATION NO. | : 13/156456 | |
| DATED | : October 15, 2013 | |
| INVENTOR(S) | : Akio Yoshigai | |

It is certified that error appears in the above-identified patent and that said Letters Patent is hereby corrected as shown below:

In the Claims

Column 16, Line 40 (Claim 3), delete "haying" and insert --having--.

Signed and Sealed this
Twenty-ninth Day of December, 2015

Michelle K. Lee
*Director of the United States Patent and Trademark Office*